US007713616B2

(12) United States Patent
Kuntz et al.

(10) Patent No.: US 7,713,616 B2
(45) Date of Patent: May 11, 2010

(54) DUAL SECURITY MARK

(75) Inventors: Matthias Kuntz, Seeheim-Jugenheim (DE); Burkhard Krietsch, Dieburg (DE); Andreas Walter, Oberursel (DE)

(73) Assignee: Merck Patent GmbH, Darmstadt (DE)

( * ) Notice: Subject to any disclaimer, the term of this patent is extended or adjusted under 35 U.S.C. 154(b) by 1129 days.

(21) Appl. No.: 10/557,478

(22) PCT Filed: Apr. 30, 2004

(86) PCT No.: PCT/EP2004/004612

§ 371 (c)(1),
(2), (4) Date: Nov. 21, 2005

(87) PCT Pub. No.: WO2004/101890

PCT Pub. Date: Nov. 25, 2004

(65) Prior Publication Data

US 2007/0006127 A1 Jan. 4, 2007

(30) Foreign Application Priority Data

May 19, 2003 (DE) ................................ 103 22 841

(51) Int. Cl.
*B32B 5/16* (2006.01)

(52) U.S. Cl. .................... 428/324; 428/195.1; 428/206; 428/207; 428/323; 428/402; 428/403; 428/690; 283/72; 427/146; 427/152

(58) Field of Classification Search ............. 428/195.1, 428/206, 207, 323, 324, 332, 357, 402, 403, 428/690, 916; 283/72; 427/146, 152
See application file for complete search history.

(56) References Cited

U.S. PATENT DOCUMENTS

| | | | | |
|---|---|---|---|---|
| 4,863,783 | A | 9/1989 | Milton | |
| 5,223,360 | A | 6/1993 | Prengel et al. | |
| 6,210,777 | B1 | 4/2001 | Vermeulen et al. | |
| 6,565,770 | B1 * | 5/2003 | Mayer et al. | 252/301.36 |
| 6,572,784 | B1 * | 6/2003 | Coombs et al. | 252/301.16 |

FOREIGN PATENT DOCUMENTS

| | | |
|---|---|---|
| DE | 2443164 | 1/1976 |
| DE | 3938055 | 5/1991 |
| EP | 0219743 | 4/1987 |
| EP | 0226367 | 6/1987 |
| EP | 0657297 | 6/1995 |
| EP | 0681009 | 11/1995 |
| EP | 0756945 | 2/1997 |
| FR | 2478695 | 9/1981 |
| JP | 2002285061 | 10/2002 |

OTHER PUBLICATIONS

Patent Abstracts of Japan vol. 2003, No. 2, Feb. 5, 2003.

* cited by examiner

*Primary Examiner*—Mark Ruthkosky
*Assistant Examiner*—David J Joy
(74) *Attorney, Agent, or Firm*—Millen, White, Zelano & Branigan, P.C.

(57) ABSTRACT

The invention relates to a flat dual security feature which comprises two different security components, one of which can be verified in the visible spectral region and one of which can be verified in the ultraviolet spectral region of light, and which comprises flake-form effect pigments and luminescent pigments in such a low concentration that the latter are evident to the naked eye as individual particles under the action of UV light; to a process for the production thereof, and to the use thereof.

29 Claims, No Drawings

DUAL SECURITY MARK

The invention relates to a flat dual security feature which comprises two different security components, one of which can be verified in the visible spectral region and one of which can be verified in the ultraviolet spectral region of light. The present invention furthermore relates to a process for the production of a security feature of this type and to the use thereof in documents of value.

Documents of value, such as banknotes, cheques, credit cards, shares, passports, identity documents, driving licences, entry tickets, fee stamps and the like, have for many years been provided with a wide variety of security features in order to make counterfeiting of these products more difficult or in the ideal case to make it completely impossible. Since cases of extensive product piracy have been increasing in recent years, this also applies to an increasing extent to other elements of product protection, such as, for example, labels, packaging materials, seals, etc.

The security features used here are divided into various classes. Thus, the so-called human features are security features which can be perceived as security features visually or via the sense of touch by the untrained observer without the use of aids and under general light conditions, such as natural or artificial daylight, with average visual acuity. These security features are also known as first level feature.

So-called second level features, by contrast, are security features which can easily be determined using simple, widespread aids, such as, for example, UV lamps, UV diodes or optical magnifiers.

Although special instruments which enable particularly trained experts to investigate and thus check the authenticity of documents of value of all types have been developed in the meantime, the first-mentioned first and second level features are the features which are intended to enable the so-called "man on the street" or also the checkout operator in the supermarket to check the authenticity of, in particular, circulating banknotes rapidly and inexpensively and to lead to adequate security in usual business dealings. For this reason, these features are employed particularly frequently.

It is evident that the counterfeiting of documents of value having security features is made more difficult by increasing the number of security features and using security features from different classes. Experience shows that security is not just doubled by a second security feature, but instead that the increase in security can be much greater since potential counterfeiters are forced to experiment with different combination possibilities. For this reason, a plurality of security features of different types are preferably combined with one another in a document of value. These are generally present alongside one another, so that a plurality of mutually independent security features, whose type and position must be known by the examining person in order to be able to find the features present with or without aids, are located on the document of value.

This is a time-consuming process if, for example in the case of banknotes, security features are located on both sides of the banknote. In addition, the application of a plurality of security features of different types also results in a significant increase in production costs, in particular in the case of documents of value which, like banknotes, are in circulation in large quantities. In addition, the effects of various security features may be reduced or misrepresented by colour or metallic overprints in the case of combination of features, which may cause uncertainty in the assessment of the authenticity of the security features.

It is known to use as human features, for example, coloured prints in various forms whose colouring changes at varying viewing angles. This variable colour can relate to light/dark effects, metallic effects, iridescent effects, "holographic" effects or a visible change in colour when viewing the feature inside or outside the specular angle. In order to achieve these effects, it is known, inter alia, to use effect pigments of all types, for example transparent or opaque, pearlescent or optically variable pigments, in these features. For the production of the security features, these pigments are often used in printing inks by means of which the security feature is printed on. However, the pigments can also be incorporated into plastic materials and then preferably applied in strip form in or on the document of value.

Thus, for example, U.S. Pat. No. 5,171,363 and U.S. Pat. No. 5,279,657 disclose optically variable printing inks which comprise optically variable flake-form pigments which have a multilayered thin-film structure and preferably consist of a central reflector layer and dielectric interlayers and thin transparent absorption layers on both sides of the central absorption layer. These pigments have an aspect ratio (ratio of the average diameter to the average particle thickness) of at least 2:1 and average diameters of 2-200 μm. They exhibit precisely two different colours with varying viewing angle. This can be ensured by the addition of absorbent pigments or dyes which are intended to filter out undesired intermediate hues. These printing inks can be used for the production of optically variable flat security features.

For use in second level security features, dyes which luminesce, preferably fluoresce, in particular in the ultraviolet spectral region, are available which have also been employed therein for a long time in the form of pigments, soluble dyes or fibres. These can either be incorporated directly into the base materials, such as paper or plastic films, or applied thereto in a coating.

Thus, DE 24 43 164 discloses a thermoplastic film comprising particles therein which convert incident, invisible, electromagnetic radiation into visible light, can be in the form of grains, rods or threads and have a grain size or thickness of 0.3 to 600 μm and, in the case of rods or threads, a length of 0.03 to 20 mm. These particles are uniformly distributed in the thermoplastic film and are present in the film in a concentration of 0.03 to 10% by weight, based on the total weight.

On irradiation, the luminescent effect of the individual particles can be perceived without further aids.

This is a second level feature which can only be verified under UV light. In addition, the radiation-modifying particles are present throughout the thermoplastic film, which increases the production costs of documents of value produced therefrom. An additional security feature which is evident without any aids is not described here.

FR 2 478 695 discloses a security paper having luminescent particles which consist of agglomerates with a size of 30 to 50 μm of luminescent particles with a size of 3 to 5 μm and are uniformly distributed in the paper material, so that they are separate from one another and cannot be perceived with the naked eye under daylight, but can under UV light. They are present in the paper in an amount of 0.5 to 5% by weight.

This feature has likewise not been described alongside a further feature visible in daylight. The entire paper comprises the luminescent particles. If this should later be provided with further security features, the effect of the security feature located in the paper may be concealed and/or attenuated.

EP 226 367 describes a security paper which comprises, like the security paper described above, individually recognisable particles having a size of 30 to 500 μm which are visible under certain illumination. Particles of different colours can be mixed with one another. The particles are present in the paper or in a coating on the paper in a low concentration. No further security feature which is evident under daylight without aids has been described.

WO 02/078964 discloses a colour coding for labelling articles which consists of coloured particles which reflect and scatter in the visible spectral region, are invisible to the naked eye and are present in such a low concentration that the colour coding is not perceived visually as colouring of the article. However, it can be recognised on viewing using an optical magnifier. Machine-readable features in the form of luminescent substances can be present simultaneously. Both the visually perceptible feature and also the machine-readable feature are second level features which require an aid, here in the simplest case a magnifying glass and a UV lamp, for verification.

EP 971 008 discloses a two-component intaglio printing ink for security printing which, besides a varnish, comprises a metallic pigment which preferably has a size of less than 18 μm. This may also be replaced by a pearlescent pigment. In addition, small amounts of a fluorescent pigment may be added to this printing ink. The size and action of the last-mentioned pigment is not disclosed. However, intaglio printing inks have a high viscosity and leave uneven print lines behind, meaning that alignment of metallic pigments or pearlescent pigments parallel to the printed area in the undried ink is only possible with difficulty, and the printed surface is not smooth. However, this is, in particular in the case of pearlescent pigments, a vital requirement for the pigments being able to achieve their full action through reflection and interference and thus obtaining high gloss and the desired colour effects. A first level security element produced using an intaglio printing ink nowadays normally no longer meets the requirements of a security feature which can be identified unambiguously even for non-experts, since, in particular, an optically variable colour design cannot be achieved in good quality. Furthermore, the intaglio printing process is economically unfavourable since approximately half of the printing ink cannot be utilised as a consequence of the process and has to be discarded.

There was therefore a demand for security features for documents of value which simultaneously comprise a plurality of security classes on a defined area unit of the document of value, can easily be verified and can be produced in good quality in a simple manner.

The object of the present invention consists in providing a security feature for documents of value and articles to be protected which simultaneously comprises, on a defined area unit of the document of value or article, at least two security components, one of which can easily be recognised and distinguished by the human eye in the visible spectral region and a second of which can easily be recognised and distinguished by the human eye in the ultraviolet spectral region of light, where these security components are not mutually obstructive in their efficacy and do not reduce the latter.

A further object consists in providing a simple, inexpensive process, suitable for mass production, for the production of a security feature of this type.

In addition, a further object consists in indicating the use of the above-mentioned security feature.

The object of the invention is achieved by a flat dual security feature comprising at least one flake-form effect pigment and at least one pigment having an average particle size of 1-60 μm which luminesces in the ultraviolet spectral region, where the luminescent pigments are present in such a low concentration that they are evident to the naked eye as individual particles under the action of UV light.

The object of the invention is furthermore achieved by a process for the production of a security feature in which a coating solution which comprises at least one flake-form effect pigment and at least one pigment having an average particle size of 1-60 μm which luminesces in the ultraviolet spectral region in a proportion of 0.01 to 3% by weight, based on the coating solution, and at least one suitable binder is applied, over the entire surface or partially, to at least one surface of a document of value or of an article to be protected, dried and optionally solidified, and where the flake-form effect pigment is aligned essentially parallel to the coated surface of the document of value or of the article to be protected.

The object is additionally achieved by a process for the production of a security feature in which a polymeric layer which has two surfaces lying essentially parallel to one another and comprises at least one flake-form effect pigment and at least one luminescent pigment having an average particle size of 1-60 μm in a proportion of 0.001 to 1% by weight, based on the polymeric layer, and at least one polymer is applied or introduced over the entire surface or partially to or into a document of value or an article to be protected, and where the flake-form effect pigment is aligned essentially parallel to the surfaces of the polymeric layer.

The object of the invention is additionally achieved by the use of the security feature described above in documents of value or on articles of daily use to be protected.

For the purposes of the invention, documents of value is taken to mean banknotes, cheques, credit cards, shares, passports, identity documents, driving licences, entry tickets, fee stamps, labels, packaging materials, seals and the like.

Articles of daily use to be protected are, for example, clothing, shoes, household articles, domestic electronic articles and the like which have the security feature according to the invention directly on the article.

A dual security feature is taken to mean a security feature which comprises, on a defined area unit of a document of value or article to be protected, two different security components from different security classes, one of which is preferably classified as a first level feature and can be recognised and distinguished with average human visual acuity without any aids in natural or artificial daylight having a wavelength of 380 to 780 nm, and the second of which can preferably be classified as a second level feature and can preferably be recognised and distinguished under the action of ultraviolet light having a wavelength of 50 to 380 nm with average human visual acuity without aids other than a UV light source. Vision aids (spectacles, etc.) which are intended to compensate for individual defective eyesight are not taken to mean aids here.

The flat dual security feature in accordance with the present invention comprises at least one flake-form effect pigment and at least one pigment having an average particle size of 1-60 μm which luminesces in the ultra-violet spectral region, which is present in very low concentration.

Flake-form effect pigments are taken to mean flake-form pearlescent pigments, predominantly transparent or semi-transparent interference pigments and metal-effect pigments. Liquid crystal pigments, so-called LCPs, are also included here. These flake-form effect pigments are built up from one or more layers of materials, which can be different if desired.

Pearlescent pigments consist of transparent flakes of high refractive index and exhibit a characteristic pearlescence due to multiple reflection when aligned in parallel. Pearlescent pigments of this type which additionally also exhibit interference colours are known as interference pigments.

Although natural and classical pearlescent pigments, such as $TiO_2$ flakes, basic lead carbonate, BiOCl pigments or nacreous pigments, are suitable in principle, the flake-form effect pigments preferably employed for the purposes of the invention are interference pigments or metal-effect pigments which have at least one coating of a metal, metal oxide, metal oxide hydrate or mixtures thereof, a metal mixed oxide, metal suboxide, metal oxynitride, metal fluoride, BiOCl or a polymer on an inorganic flake-form support.

The inorganic flake-form support preferably consists of natural or synthetic mica, kaolin or other phyllosilicates, of glass, $SiO_2$, $TiO_2$, $Al_2O_3$, $Fe_2O_3$, polymer flakes, graphite flakes or of metal flakes, such as, for example, of aluminium, titanium, bronze, silver, copper, gold, steel or diverse metal alloys.

Particular preference is given to supports comprising mica, glass, $SiO_2$, $TiO_2$ and $Al_2O_3$ or mixtures thereof.

The size of these substrates is not crucial per se. The substrates generally have a thickness of between 0.01 and 5 μm, in particular between 0.05 and 4.5 μm. The length or width dimension is usually between 1 and 250 μm, preferably between 2 and 200 μm and in particular between 2 and 100 μm. They generally have an aspect ratio (ratio of the average diameter to the average particle thickness) of 2:1 to 25,000:1, and in particular of 3:1 to 2000:1.

A coating applied to the support preferably consists of metals, metal oxides, metal mixed oxides, metal suboxides or metal fluorides and in particular of a colourless or coloured metal oxide, selected from $TiO_2$, titanium suboxides, titanium oxynitrides, $Fe_2O_3$, $Fe_3O_4$, $SnO_2$, $Sb_2O_3$, $SiO_2$, $Al_2O_3$, $ZrO_2$, $B_2O_3$, $Cr_2O_3$, ZnO, CuO, NiO or mixtures thereof.

Coatings of metals are preferably of aluminium, titanium, chromium, nickel, silver, zinc, molybdenum, tantalum, tungsten, palladium, copper, gold, platinum or alloys comprising these.

The metal fluoride employed is preferably $MgF_2$.

The flake-form effect pigments employed are particularly preferably multi-layered effect pigments. These have, on a flake-form support, a plurality of layers which preferably consist of the above-mentioned materials and have various refractive indices in such a way that in each case at least two layers of different refractive index are located alternately on the support, where the refractive indices in the individual layers differ by at least 0.1 and preferably by at least 0.3. The layers located on the support here can be either virtually transparent or coloured or semi-transparent.

Likewise, the so-called LCPs, which consist of crosslinked, aligned, cholesteric liquid crystals, can be employed as flake-form effect pigments. They are known, in particular, as optically variable pigments.

The flake-form pigments described above are present individually or in a mixture in the dual security feature in accordance with the present invention and are preferably employed individually. However, they can also be mixed with other known organic or inorganic absorption pigments or absorption dyes.

The flake-form effect pigments employed in accordance with the invention are predominantly transparent or semi-transparent, i.e. they transmit at least 10% of the incident light.

For the purposes of the invention, the flake-form effect pigments are preferably optically variable pigments which exhibit at least two and at most four optically clearly distinguishable discrete colours at at least two different illumination or viewing angles, but preferably exhibit two optically clearly distinguishable discrete colours at two different illumination or viewing angles or three optically clearly distinguishable discrete colours at three different illumination or viewing angles. This behaviour is also known as colour flop. Preferably, only the discrete hues are present in each case and no intermediate hues, i.e. a clear change from one colour to another colour is evident on tilting the security feature comprising the optically variable pigments. This property makes it easier for the viewer firstly to recognise the security feature (first level feature) as such and at the same time makes it more difficult to copy this feature since colour flop effects cannot be copied and reproduced in commercially available colour copiers.

If the flake-form effect pigments are introduced into a coating solution, they are present therein in a proportion of 5-40% by weight, based on the weight of the coating solution, and in particular in a proportion of 15 to 30% by weight.

If, by contrast, the flake-form effect pigments are incorporated into a polymeric layer, they are present therein in a proportion of 0.2 to 10% by weight, based on the weight of the polymeric layer, and in particular in a proportion of 0.3 to 5% by weight.

In order to be able to develop their full optical effect, the flake-form effect pigments employed in accordance with the invention must be in aligned form in the security feature comprising them, i.e. they are aligned virtually parallel to the surfaces of the document of value or of the article to be protected that are provided with the security feature. The way in which this is carried out is described in greater detail below.

The flake-form effect pigments employed can be the commercially available interference pigments offered, for example, under the names Iriodin®, Colorstream®, Xirallic®, Lustrepak®, Colorcrypt®, Colorcode® and Securalic® from Merck KGaA, Mearlin® from Mearl, metal-effect pigments from Eckhard and goniochromatic (optically variable) effect pigments, such as, for example, Variochrom® from BASF, Chromafflair® from Flex Products Inc. or Helicone® from Wacker, and other commercially available pigments of the same type.

The pigments which luminesce in the ultraviolet spectral region are pigments which emit a visible radiation under the action of UV light.

These are preferably pigments which fluoresce under UV light having a wavelength of 50 to 380 nm.

These have an average particle size of 1-60 μm and preferably of 2-40 μm. It is not critical here whether these pigments consist of individual particles or of agglomerates of individual particles so long as they exhibit an overall particle size in the limits indicated above.

The luminescent pigments may either consist of particulate luminescent dyes or may also be, for example, particulate resins, such as melamine resins, impregnated with luminescent dyes.

They are in irregular shape of grains, granules, etc., or alternatively in regular shapes, such as spheres, cuboids, cubes and the like.

The luminescent dyes may be organic or inorganic dyes. However, they and the particles comprising them must be easily and uniformly dispersible in printing inks, printing varnishes, coating solutions, polymers and the like in order to ensure uniform distribution in the use medium.

Luminescent pigments of this type are known to the person skilled in the art. These are, for example, fluorescent pigments from Honeywell Speciality Chemicals Seelze GmbH, which are marketed under the product names Lumilux® Red CD 340, Lumilux® yellow CD 397, Lumilux® Green CD 302 or Lumilux® Blue CD 329.

Also suitable are products such as Imperial Invisible® Lemon UV-YG, Imperial Invisible® Red UV-R, Imperial Invisible® Blue UVB-5 from Imperial Materials Ltd. or products such as Luminescent Pigment® L-142, L-174, L-187, L-184, or L-212 from Beaver Luminescers.

Also suitable in principle are particular luminescent dyes, such as, for example, the spherical vesicles described in EP 219 743, which have a transparent wall and are filled with fluorescent dyes.

However, flake-form pigments having at least one coating located on a flake-form support which additionally comprise fluorescent dyes in the coating and are described in the as yet unpublished European patent application with the file reference EP 02022552.0 have proven particularly suitable. The coating comprising the fluorescent dye may be located here on a support which as such represents a flake-form effect pigment, as already described above.

If these are employed, the luminescent pigments are flake-form individual particles which align in the use medium, i.e. can align parallel to the surfaces of the document of value or article to be protected that are provided with the security feature comprising the luminescent pigment or the surfaces of a polymeric layer comprising the luminescent pigment.

The particle size is the crucial factor for the luminescent particles having a sufficiently large amount of luminescent dye and thus a sufficiently large luminance in order to be recognised as individual particles under the action of UV light.

The luminescent pigments may be in individual form in the dual security feature according to the invention or in a combination of two or more differently coloured pigments. Preference is given here to a mixture of at least two differently coloured pigments.

The luminescent pigments are present in the dual security feature according to the invention in such a low concentration that they can be recognised with the naked eye as individual particles under the action of UV light.

The expression "can be recognised with the naked eye" here is intended to relate to the average visual acuity of an average person with no vision defects or a vision defect present that can be corrected with a vision aid (for example spectacles, contact lenses, magnifying glasses, etc.). Individual impaired vision, such as colour blindness, etc., is not included in this expression The above-mentioned vision aids are not regarded as aids which are necessary for verification of a second levels features.

In order to be able to achieve such a low concentration in the security feature, a coating solution by means of which the security feature according to the invention is applied to a document of value or an article to be protected and which comprises both flake-form effect pigments and also luminescent particles having an average particle size of 1-60 μm must comprise the latter in a proportion of 0.01 to 3% by weight, based on the coating solution, and in particular of 0.01 to 2% by weight. If the luminescent pigment employed is a mixture of differently coloured pigments, this proportion by weight in each case relates to the total amount of luminescent particles employed.

If the security feature according to the invention is applied or introduced as polymeric layer to or into a document of value or an article to be protected, the luminescent particles are present, besides the flake-form effect pigments, in the polymeric layer in a proportion of 0.001 to 1% by weight and in particular of 0.01 to 0.3% by weight, based on the weight of the polymeric layer. Here too, this proportion relates to the total amount of luminescent particles employed if a mixture of differently coloured luminescent particles is employed.

Furthermore, the proportion of the luminescent pigment in the coating solution or polymeric layer from which the security feature is formed is dependent on the type of flake-form effect pigment employed. The more transparent the flake-form effect pigment, the lower the proportion by weight of the luminescent pigments can be. If, for example, the flake-form effect pigments employed are interference pigments which comprise only colourless transparent layers of metal oxides, for example of $TiO_2$, $SiO_2$, $Al_2O_3$, $ZrO_2$, ZnO, etc., on a colourless transparent support comprising mica, $SiO_2$, $Al_2O_3$ or glass, a concentration of luminescent pigments in the lower region of the proportions by weight described above is possible. With coloured, partially transparent layers on the flake-form support materials or even with the use of metal-effect pigments, however, the transparency of the effect pigments drops considerably. It may therefore be that in these cases at least some of the luminescent pigments are covered and thus concealed by the flake-form effect pigments in the dual security feature. For this reason, a higher concentration of luminescent pigments is necessary in the dual security feature with decreasing transparency of the effect pigments, and is set via concentrations in the coating solution or in the polymeric layer which are in the upper regions of the parts by weight indicated above.

As already described briefly above, the dual security feature according to the invention can be applied in at least two different, preferred manners to the document of value or the article to be protected.

The former case is a coating process with a coating solution which comprises, besides a customary binder, the flake-form effect pigment described above and a luminescent pigment having a particle size of 1-60 μm in a low concentration.

This is preferably a printing ink which, besides the said pigments, comprises one or more binders which are conventional for printing inks and optionally conventional additives, such as solvents, adhesion promoters, drying accelerators, photoinitiators, etc.

A preferred embodiment of the security feature according to the invention therefore consists in a coating on a document of value or article to be protected which is produced by means of a coating solution, preferably a printing ink. This coating may be located either over the entire surface or partially on the document of value or article to be protected.

If the dual security feature according to the invention is the only security feature of the document of value, it is preferably present over the entire surface of the latter. These are preferably documents of value which have to guarantee a lower security standard, such as, for example, packaging materials, labels, seals, entry tickets and the like. However, application over the entire surface also applies if further security features are located exclusively on the side of the document of value opposite the coating. However, if the documents of value are intended to have a multiplicity of different security features on both sides, as is the case for high security standards, partial coating with the security feature according to the invention, in particular, comes into consideration. In this case, the security feature can be applied in different, unrestricted forms, for example in strips, dots, dashes, alphanumeric symbols, graphic representations, etc. This shaping is limited merely by the application method and the recognisability of the two security components in the security feature. A sufficiently large area should therefore suitably be coated with the dual security feature according to the invention in order that both security components can be clearly and unambiguously recognised and assessed by the viewer.

If articles of daily necessity to be protected, such as clothing, shoes, household articles or the like, are coated with the security feature according to the invention, partial coating is likewise appropriate for practical reasons. The shape and size of this coating is not limited in any way and can advantageously be incorporated into the visual design of the articles of use.

The coating solution is preferably of such low viscosity that the flake-form effect pigments located therein are able to align essentially parallel to the coated surface of the document of value or article in the still-moist coating solution after application of the coating solution to the document of value to be printed or article to be protected. The expression "essentially parallel" here means that the flake-form effect pigments are in their predominant majority in the coating solution at an angle of between 0 and 30 degrees to the surface of the coated document of value or article to be protected. This alignment is retained after drying of the coating solution. Only individual flake-form effect pigments have a position in which a tilt to the coated surface at an angle of greater than 30 degrees is observed.

If the luminescent pigments, as described above, also consist of flake-form pigments with a coating comprising a fluorescent dye, these luminescent pigments are also able to align essentially parallel to the printed surface of the document of value or of the article to be protected in the still-moist coating solution.

Since these pigments, owing to their shape, are otherwise very similar in their dispersion and settling behaviour to the flake-form effect pigments employed, the risk of separation of the two components does not exist either in the fresh coating solution or in the coating produced therewith, and particularly good and uniform dispersibility of all particulate components is ensured. This results in dual security features in accordance with the present invention which shows off the security components in particularly good quality alongside one another both in the visible spectral region and in the ultraviolet spectral region, without mutual interference or reduction in quality taking place.

However, it has been found, surprisingly, that even on use of luminescent pigments having the grainy, granular, spherical or cubic, etc., shape described above, they can readily be dispersed in a fine distribution on simultaneous use of flake-form effect pigments in a coating solution and have no noteworthy settling behaviour, so that separation of the particulate components cannot be observed. It is not known why separation of this type, which would have been expected at the relatively low viscosity set for the coating solutions, is not observed. However, it is advantageous that stable coating solutions which can be employed in all modern printing and coating methods and result in dual security features which exhibit both a first level feature and also a second level feature of good quality and without mutual impairment are obtainable even with luminescent pigments shaped in this way in the simultaneous presence of flake-form effect pigments.

The viscosity of the coating solution must be set here so that it is optimally matched to the coating method to be used and the material to be coated. In particular, the coating solution employed for the production of the dual security feature according to the invention should be usable in printing processes, such as offset printing, offset coating, flexographic printing processes, screen printing processes, halftone photogravure printing processes or the overprint varnish process and should be suitable for the printing of materials such as papers of all conventional types, of textile materials, of polymeric materials, in particular polymeric layer materials and films, and of metals. Since coating processes, such as, for example, knife coating, brushing, stamping, pouring processes, flow processes, roll or matrix application processes or application by means of an air brush, are also employed, in particular, for the coating of articles made from paper or textile materials, the viscosity of the coating solution can also be set in such a way that it is suitable for coating processes of this type.

Furthermore, the security feature according to the invention can be applied to or introduced into the document of value or the article to be protected in the form of a polymeric layer.

A further preferred embodiment of the invention is therefore a polymeric layer which represents the security feature according to the invention and is located on or in a document of value or article to be protected. This polymeric layer is either present over the entire surface or partially on the document of value or article to be protected.

This can be, for example, a film laminated or adhesively bonded to a document of value over the entire surface or, for example, a film coextruded with other polymer films (with or without security features). Rigid sheets of polymeric materials which comprise both flake-form effect pigments and also luminescent pigments and are bonded in a conventional manner, for example by adhesive bonding, to other layer materials, optionally carrying information, are also suitable. These films or sheets can be located either on the surface of the document of value or in an interlayer which is surrounded on both sides by other polymer layers. However, they can also form per se the basis of a document of value. In this case, the thickness of the polymer layers, the polymeric material, the flexibility and the type of bonding of these layers to other layers of the document of value is not restrictive so long as the two security components of the security feature according to the invention can advantageously be recognised and assessed unambiguously in the visible wavelength region and also in the ultraviolet wavelength region.

The polymeric layer can likewise be applied partially to or introduced partially into a document of value. Here, as in the case of coating, any conceivable shape is suitable so long as the two security components of the security feature can still be recognised and assessed unambiguously by the viewer. All shapes already mentioned for the coating process come into consideration. Preference is given here to the application or introduction of a strip-shaped polymeric layer to or into a document of value.

If the polymeric layer is applied to an article to be protected, it is for practical and aesthetic reasons preferably likewise present partially on the surface thereof.

The type of partial application or introduction into the document of value or the article to be protected should not be regarded as restrictive. For example, adhesive bonding, lamination or other common types of bonding to other materials which are conventional for polymeric layer materials may be mentioned here.

The other layer materials preferably consist of papers of various types or polymeric materials, but can also be textile materials or metals, etc.

If the security feature according to the invention consists of a polymeric layer, the security feature in the form of the polymeric layer has two surfaces lying essentially parallel to one another and comprises in the polymeric layer at least one flake-form effect pigment and at least one luminescent pigment as well as at least one polymer.

Polymers which can be employed here are all thermoplastics which exhibit an inert behaviour towards the luminescent pigments and the flake-form effect pigments. This applies, for example, to polystyrene, polyvinyl chloride and copolymers and graft polymers thereof, polyvinylidene chloride and fluoride, polyamides, polyolefins, polyacrylates and polyvinyl esters, thermoplastic polyurethanes, cellulose esters and the like. They can be employed individually or in a mixture.

In addition, the polymeric layer may additionally comprise conventional assistants and additives, such as fillers, UV stabilisers, inhibitors, flame-proofing agents, lubricants, plasticisers, solvents, dispersants and additional dyes or coloured pigments.

The polymeric layers are preferably produced by various suitable processes, such as extrusion processes, calendering or pressing processes, but in particular by extrusion processes or via a film blowing process. To this end, the various starting materials are mixed with one another and converted into polymer layers in the form of films of various thickness or thin sheets in suitable, generally known plants. The flake-form effect pigments present in the polymer composition or, if present, the likewise flake-form fluorescent pigments described above are aligned at the surfaces of the moulds and are therefore aligned essentially parallel to the surfaces of the polymeric layer in the polymeric layers formed. Stretching and drawing operations during film blowing or as working step following extrusion additionally increase this alignment of the pigments. This alignment is fixed on subsequent cooling.

The expression "essentially parallel" can likewise be defined here as described above for the alignment of the pigments in the coating solution.

A separation or settling behaviour of the pigment mixture employed is not observed in the polymeric layers.

The dual security feature according to the invention can be produced as follows with respect to the various embodiments of the security feature described above:

In a first process, the security feature in accordance with the present invention can be produced by applying a coating solution which comprises at least one flake-form effect pigment and at least one pigment having an average particle size of 1-60 μm which luminesces in the ultraviolet spectral region in a proportion of 0.01 to 3% by weight, based on the coating solution, and at least one suitable binder over the entire surface or partially to at least one surface of a document of value or of an article to be protected, drying and optionally solidifying the solution, where the flake-form effect pigment is aligned essentially parallel to the coated surface of the document of value or of the article to be protected.

The proportion of flake-form effect pigments in the coating solution here is 5-40 and preferably 15-30% by weight, based on the weight of the coating solution.

A preferred proportion of luminescent pigment in the coating solution is in a proportion by weight of 0.01 to 2% by weight, based on the coating solution, where both the above-mentioned proportion and also the proportion preferably employed mentioned here is based on the total amount of luminescent pigments if a mixture of two or more differently coloured pigments of this type is employed.

The binders employed can be all binders conventional for coating solutions, for example natural products, such as digested caseine or starch, as well as synthetic binders, such as polymer dispersions based on acrylates, styrene, butadiene, and (co)polymers based on, for example, ethylene, (meth)acrylates, vinyl chloride, vinylidene chloride or vinyl acetate, as well as polyamides, polyesters, polyurethanes, mixtures thereof or also reactive nematic and cholesteric liquid crystals. These can be compounded by the addition of resins, plasticisers, fillers or pigments and the like.

This selection can be extended at any time by the person skilled in the art through further common binders.

Furthermore, further conventional additives, such as solvents, adhesion promoters, drying accelerators, photoinitiators, etc., can optionally be added to the mixture for the preparation of the coating solution.

The coating solution is preferably a printing ink.

It is possible to prepare water-containing, solvent-containing and also UV light-curing printing inks, which form the security feature according to the invention in the form of a print on a document of value or article to be protected.

The coating solution is applied over the entire surface or partially to a document of value or an article to be protected via a coating process, preferably a printing process.

These are preferably known printing processes, such as offset printing, offset coating, flexographic printing processes, screen printing processes, halftone photogravure printing processes or the overprint varnish process.

However, it is also possible to employ other coating processes, such as, for example, knife coating, brushing, stamping, pouring processes, flow processes, roll or matrix application processes or application by means of an air brush.

The coated materials are, for example, papers of all conventional types, textile materials and polymeric materials, in particular polymeric layer materials and films, or metals.

Regarding full-area and partial coating, reference is made here to the possibilities already described above for the coated security feature according to the invention.

The drying and optional solidification of the applied coating can be carried out or accelerated by means of known assistants, such as, for example, under the influence of pressure, temperature, steam, UV initiators or by means of electron beam curing. The applied coating dries here, and crosslinking or curing processes take place where appropriate. These can likewise have an optimising effect on the target alignment of the flake-form particles in the dried coating.

A further possibility for the production of the security feature according to the invention consists in a process in which a polymeric layer which has two surfaces lying essentially parallel to one another and comprises at least one flake-form effect pigment and at least one luminescent pigment having an average particle size of 1-60 μm in a proportion of 0.001 to 1% by weight, based on the polymeric layer, and at least one polymer is applied or introduced over the entire surface or partially to or into a document of value or an article to be protected, where the flake-form effect pigment is aligned essentially parallel to the surfaces of the polymeric layer.

The polymeric layer is produced, as already described above, by mixing the flake-form effect pigment and the luminescent pigment with at least one polymer, which can be, for example, a polystyrene, polyvinyl chloride and a copolymer and graft polymer thereof, a polyvinylidene chloride or fluoride, a polyamide, polyolefin, polyacrylate or polyvinyl ester, a polyurethane and a cellulose ester, etc., or a mixture thereof. It is furthermore possible to add assistants and additives which are conventional in plastics processing, such as fillers, UV stabilisers, inhibitors, flameproofing agents, lubricants, plasticisers, solvents, dispersants and additional dyes or coloured pigments or the like. These polymers and additives are generally known to the person skilled in the art and can be determined in a simple manner for the specific application.

This mixture is converted into polymer layers of various thickness and flexibility, i.e. into films or thin sheets, in suitable, generally known plants which are suitable for the production of layer-shaped polymer materials by extrusion, calendering, by pressing or film blowing processes. As a consequence of the process, alignment of the flake-form pigments takes place in the polymer composition here, which is essentially parallel to the resultant surfaces of the polymer layers. This alignment of the pigments can be further reinforced by stretching and drawing operations carried out subsequently or during the layer production and is fixed during the cooling operation.

The polymeric layer obtained in this way can be produced and bonded at the same time as other polymer films, which may have further security features, which is advantageously carried out via a coextrusion process. However, it can also be bonded in a known manner to various other layer materials, such as papers of various types, textile materials or also other plastic layers, by means of known lamination, adhesive bonding, pressing or embossing processes and the like.

It is unimportant here whether the polymeric layer forming the security feature according to the invention is located on the surface of the overall composite or forms an interlayer, so long as the overlying layers, preferably at least on one part-surface, are so transparent that the two security components can be recognised and assessed unambiguously on the side of the polymeric layer that is visible from the outside in the visible wavelength region and in the ultraviolet wavelength region. In the case of application over the entire surface, the polymeric layer which comprises the flake-form effect pigment and the luminescent pigment is, however, preferably located on the surface of a document of value or article to be protected produced therewith or is merely covered by a preferably transparent further polymer layer without additional security features. However, it is likewise possible for the polymeric layer comprising the flake-form effect pigment and the luminescent pigment to form per se a substrate or a base layer for the production of a document of value, which can optionally also be provided with further security features. This variant comes into consideration, in particular, for banknotes.

The application or introduction of the polymeric layer which forms the security feature according to the invention to or into a document of value, which may comprise the various layer materials indicated above or is formed by their totality, may also be carried out partially.

To this end, the polymeric layer is comminuted to give suitably sized pieces of various suitable shapes and either incorporated into a document of value consisting of a layer composite by means of the processes described above or alternatively applied to the outer layer of a document of value by adhesive bonding, embossing, pressing or other suitable processes. The shape and size employed here for the comminuted polymer layer is not limited in any way and should advantageously be designed in such a way that the two security components of the security feature according to the invention can still be recognised and assessed unambiguously.

In particular, partial application to an article to be protected is also preferably employed if this article is products of use, such as clothing, shoes, household articles, domestic electronic articles or other articles of daily use which have the security feature according to the invention directly on their surface.

The dual security feature according to the invention can be used for protecting documents of value of all types, such as banknotes, cheques, credit cards, shares, passports, identity documents, driving licences, entry tickets, fee stamps, labels, packaging materials, seals and the like.

However, the security feature according to the invention is likewise also suitable for protecting general articles of use, such as clothing, shoes, household articles, domestic electronic articles, etc.

The security feature in accordance with the present invention can be located on the documents of value or articles to be protected described above as the only security feature or alternatively in combination with one or more identical or different security features, optionally from different security classes, but it can also be employed per se as polymeric layer as document of value itself.

The dual security feature according to the invention has on a limited area of a document of value or article to be protected, at the same time and along-side one another at least two security components, at least one of which can be verified in the visible wavelength region and at least a second of which can be verified in the ultraviolet wavelengthregion. The two security components do not mutually interfere with or impair one another.

The security component in the visible wavelength region comprises, depending on the flake-form effect pigment employed, various effects which can be recognised by the naked eye in natural or artificial daylight without aids.

For example, on use of metal-effect pigments, a metallic lustre is observed in addition to a "metallic"-effect colour, such as gold, silver or bronze, which can be increased or attenuated on viewing at various angles in relation to the incident light.

Pearlescent or interference pigments exhibit shimmering effects and have a colour which varies with the viewing angle and includes soft or more intense hues.

The optically variable pigments preferably employed exhibit intense colours which can be clearly distinguished from one another on changing the viewing and illumination angle. These can be the known interference and complementary colours which, in combination with a printed or unprinted, coloured or colourless substrate, facilitate a virtually unlimited variety of optical effects. In general, these are two to four different colours produced by the optically variable pigments. However, preference is given to the use of optically variable pigments which exhibit two or three different colours.

The colour change described above may likewise be associated with brightness and/or lustre changes.

The use of various flake-form effect pigments enables a plurality of the effects indicated above to be combined with one another. Likewise, mixing of the flake-form effect pigments with absorbent organic or inorganic dyes and/or coloured pigments enables the effects described above to be changed optically.

All these changes can be recognised by the examining person by simply tilting the security feature at various angles against a light source.

Furthermore, the security feature according to the invention has a security component which can be recognised by the viewer without further aids under the action of UV light.

Luminescent pigments, which have sufficient size and luminance, are present in the security feature according to the invention in such a low concentration that the individual particles can be perceived as such by the viewer under UV light, i.e. the viewer sees individual luminous dots which have a defined colour, uniformly distributed over a certain area unit.

It is particularly advantageous for two or more differently coloured luminescent pigments to be employed. These do not give rise to a mixed colour, but instead, owing to their low concentration, are visible as individual particles of different colour in the dual security feature according to the invention.

The manufacturer of the dual security feature according to the invention has in this way a wide range of individual coding possibilities which relate both to the use of various flake-form effect pigments, individually or in a mixture, and to the use of differently coloured luminescent pigments. This results in high security of the document of value or article to be protected provided therewith and makes counterfeiting of the dual security feature considerably more difficult.

The dual security feature according to the invention can of course be combined with any further security feature. Thus, a document of value or an article to be protected can, for example, also be provided with other iridescent, optically variable, metallic, coloured, "holographic", raised (tactile) or other security features; however, it is also possible for two or more dual security features having identical or different effects both in the visible and in the UV region to be present alongside one another.

The spatial arrangement of these different or identical security features on the document of value or the article to be protected is unrestricted.

For example, two different types of security feature are preferably in the immediate vicinity of one another, at least one of which is the dual security feature according to the invention. The latter can, for example, be arranged on one or both sides of a metal or "holographic" strip or can form the centre or edge of a coloured, iridescent, metallic, "holographic", optically variable security feature having a certain shape which is visible under UV light, or of a security feature of different design.

These design shapes are only mentioned here by way of example and can easily be found by the person skilled in the art.

A further advantage of the security feature according to the invention consists in that the two security components can also be machine read and verified by suitable detection methods. Thus, for example, corresponding detectors can be built into banknote sorting machines and establish the authenticity of the banknote to be checked with reference to the dual security feature in accordance with the present invention in a single work operation.

In addition, small mobile units for the investigation of documents of value are known which can be adapted for machine checking of the dual security feature, also enabling decentralised on-site checks to be carried out on various articles to be protected.

Although the security class of the article or document of value to be protected increases with the number and variety of combined security features, the security feature according to the invention, even when used alone, effects high counterfeiting security of the product provided therewith, since it has two security components from different security classes on a limited area, which enables any person having average visual acuity to verify both in the visible wavelength region and also in the ultraviolet wavelength region using simple means and in a simple manner and without special knowledge. At the same time, counterfeiting of a single security feature alone is made considerably more difficult for a potential counterfeiter since composition and mode of action of this security feature can neither be analysed easily nor counterfeited easily. For example, neither of the two security components can be copied using conventional colour copiers.

The following examples are intended to explain the present invention, but without restricting it:

EXAMPLE 1

20 g of an interference pigment from Merck KGaA (Colorcrypt® D Red-Gold, mica pigment with $SiO_2$ and $TiO_2$ coating) are dispersed in 79.5 g of screen printing binder from Coates (CP50). 0.50% by weight of Lumilux® Green CD 302 are subsequently added to the suspension and likewise dispersed. The viscosity is adjusted by addition of a diluent from Coates (CPV), and the suspension is printed onto paper through a screen (77T). After the printing ink has dried, the resultant print image is viewed in daylight. A readily visible red coloration is apparent at the specular angle at an acute angle and an intense gold hue is visible at the specular angle at a flat angle, and a green hue is evident outside the specular angle, preferably on pale paper, which changes to a pale-green to blue-green hue when viewed in transmitted light. Under UV light, individual green fluorescent particles are readily evident on the printed area.

EXAMPLE 2

20 g of an interference pigment from Merck KGaA (Colorcrypt® D Red-Gold, mica pigment with $SiO_2$ and $TiO_2$ coating) are dispersed in 79.5 g of screen printing binder from Coates (CP50). 0.25% by weight of Lumilux® Green CD 302 and 0.25% by weight of Lumilux® Red CD 340 are subsequently added to the suspension and likewise dispersed. The viscosity is adjusted by addition of a diluent from Coates (CPV), and the suspension is printed onto paper through a screen (77T). After the printing ink has dried, the resultant print image is viewed in daylight. A readily visible red coloration is apparent at the specular angle at an acute angle and an intense gold hue is visible at the specular angle at a flat angle, and a green hue is evident outside the specular angle, preferably on pale paper, which changes to a pale-green to blue-green hue when viewed in transmitted light. Under UV light, individual green and individual red fluorescent particles are readily evident on the printed area.

The invention claimed is:

1. A flat dual security feature, comprising
at least one flake-form effect pigment, and
at least one pigment having an average particle size of 1-60 μm which luminesces in the ultraviolet spectral region,
wherein the luminescent pigments are present in such a low concentration that they are evident to the naked eye as individual particles under the action of UV light,
wherein the security feature is in the form of a coating on a document of value or article, which coating has been achieved by the application of a coating solution,
wherein the flake-form effect pigment was present in the coating solution in a proportion of 5-40% by weight based on the coating solution, and
wherein the luminescent pigment was present in the coating solution in a proportion of 0.01 to 3% by weight based on the coating solution.

2. A security feature according to claim 1, wherein the luminescent pigment has a particle size of 2-40 μm.

3. A security feature according to claim 1, comprising at least two differently coloured luminescent pigments.

4. A security feature according to claim 1, wherein the flake-form effect pigment is a pearlescent pigment, a transparent or semi-transparent interference pigment, a metal-effect pigment or a liquid crystal pigment.

5. A security feature according to claim 1, wherein the flake-form effect pigment comprises an inorganic flake-form support with at least one coating of a metal, metal oxide, metal oxide hydrate or a mixture thereof, a metal mixed oxide, suboxide, oxynitride, metal fluoride, BiOCl or a polymer.

6. A security feature according to claim 5, wherein the inorganic flake-form support consists of natural or synthetic mica, talc, kaolin, glass flakes, $SiO_2$ flakes, $TiO_2$ flakes, $Al_2O_3$ flakes, $Fe_2O_3$ flakes or a mixture thereof, polymer flakes or graphite flakes or metal flakes.

7. A security feature according to claim 1, wherein the flake-form effect pigment is a multilayered interference pigment.

8. A process for preparing a security feature according to claim 1, comprising applying a coating solution comprising at least one flake-form effect pigment in a proportion of 5-40% by weight based on the coating solution, and at least one pigment having an average particle size of 1-60 μm which luminesces in the ultraviolet spectral region in a proportion of 0.01 to 3% by weight based on the coating solution, and at least one binder, over the entire surface or partially, to at least one surface of a document of value or of an article, drying, and optionally solidifying, wherein the flake-form effect pigment is aligned essentially parallel to the coated surface of the document of value or of the article.

9. A process according to claim 8, wherein the flake-form effect pigment is present in the coating solution in a proportion of 15-30% by weight based on the coating solution.

10. A process according to claim 8, wherein the coating solution is a printing ink.

11. A process according to claim 8, wherein the coating solution is a printing ink suitable for offset printing, offset coating, flexographic printing, screen printing, halftone photogravure printing or a printing ink suitable for an overprint varnish process.

12. A process according to claim 8, wherein the luminescent pigment has a particle size of 2-40 μm.

13. A process according to claim 8, wherein the proportion of the luminescent pigment is 0.01 to 2% by weight based on the coating solution.

14. A process according to claim 8, wherein the coating solution comprises at least two differently coloured luminescent pigments.

15. A method for protecting a document of value or an article, comprising applying to said document of value or article a security feature according to claim 1.

16. A method according to claim 15, wherein the security feature is in the form of a coating on a document of value or an article.

17. A document of value, comprising a flat security feature according to claim 1, wherein The security feature has been printed on.

18. A flat dual security feature, comprising at least one flake-form effect pigment, and at least one pigment having an average particle size of 1-60 μm which luminesces in the ultraviolet spectral region, wherein the luminescent pigments are present in such a low concentration that they are evident to the naked eye as individual particles under the action of UV light, wherein the security feature is in the form of a polymeric layer which is a film on or in a document of value or article, wherein the flake-form effect pigment is present in the polymeric layer in a proportion of 0.2-10% by weight based on the weight of the polymeric layer, and wherein the proportion of the luminescent pigment is 0.001 to 1% by weight based on the weight of the polymeric layer.

19. A process for preparing a security feature according to claim 18, comprising applying or introducing at least one polymer composition to form a polymeric layer which has two surfaces lying essentially parallel to one another and comprises at least one flake-form effect pigment in a proportion of 0.2 to 10% by weight based on the weight of the polymeric layer, and at least one luminescent pigment, which luminesces in the ultraviolet spectral region, having an average particle size of 1-60 μm in a proportion of 0.001 to 1% by weight based on the polymeric layer, over the entire surface or partially to or into a document of value or an article, wherein the flake-form effect pigment is aligned essentially parallel to the surface of the polymeric layer.

20. A process according to claim 19, wherein the flake-form effect pigment is present in the polymeric layer in a proportion of 0.3 to 5% by weight based on the polymeric layer.

21. A process according to claim 19, wherein the luminescent pigment has a particle size of 2-40 μm.

22. A process according to claim 19, wherein the proportion of the luminescent pigment is 0.01 to 0.3% by weight based on the polymeric layer.

23. A process according to claim 19, wherein the polymeric layer comprises at least two different coloured luminescent pigments.

24. A security feature according to claim 18, wherein the luminescent pigment has a particle size of 2-40 μm.

25. A security feature according to claim 18, comprising at least two differently coloured luminescent pigments.

26. A security feature according to claim 18, wherein the flake-form effect pigment is a pearlescent pigment, a transparent or semi-transparent interference pigment, a metal-effect pigment or a liquid crystal pigment.

27. A security feature according to claim 18, wherein the flake-form effect pigment comprises an inorganic flake-form support with at least one coating of a metal, metal oxide, metal oxide hydrate or a mixture thereof, a metal mixed oxide, suboxide, oxynitride, metal fluoride, BiOCl or a polymer.

28. A security feature according to claim 27, wherein the inorganic flake-form support consists of natural or synthetic mica, talc, kaolin, glass flakes, $SiO_2$ flakes, $TiO_2$ flakes, $Al_2O_3$ flakes, $Fe_2O_3$ flakes or a mixture thereof, polymer flakes or graphite flakes or metal flakes.

29. A security feature according to claim 18, wherein the flake-form effect pigment is a multilayered interference pigment.

* * * * *